United States Patent Office 2,714,535
Patented Aug. 2, 1955

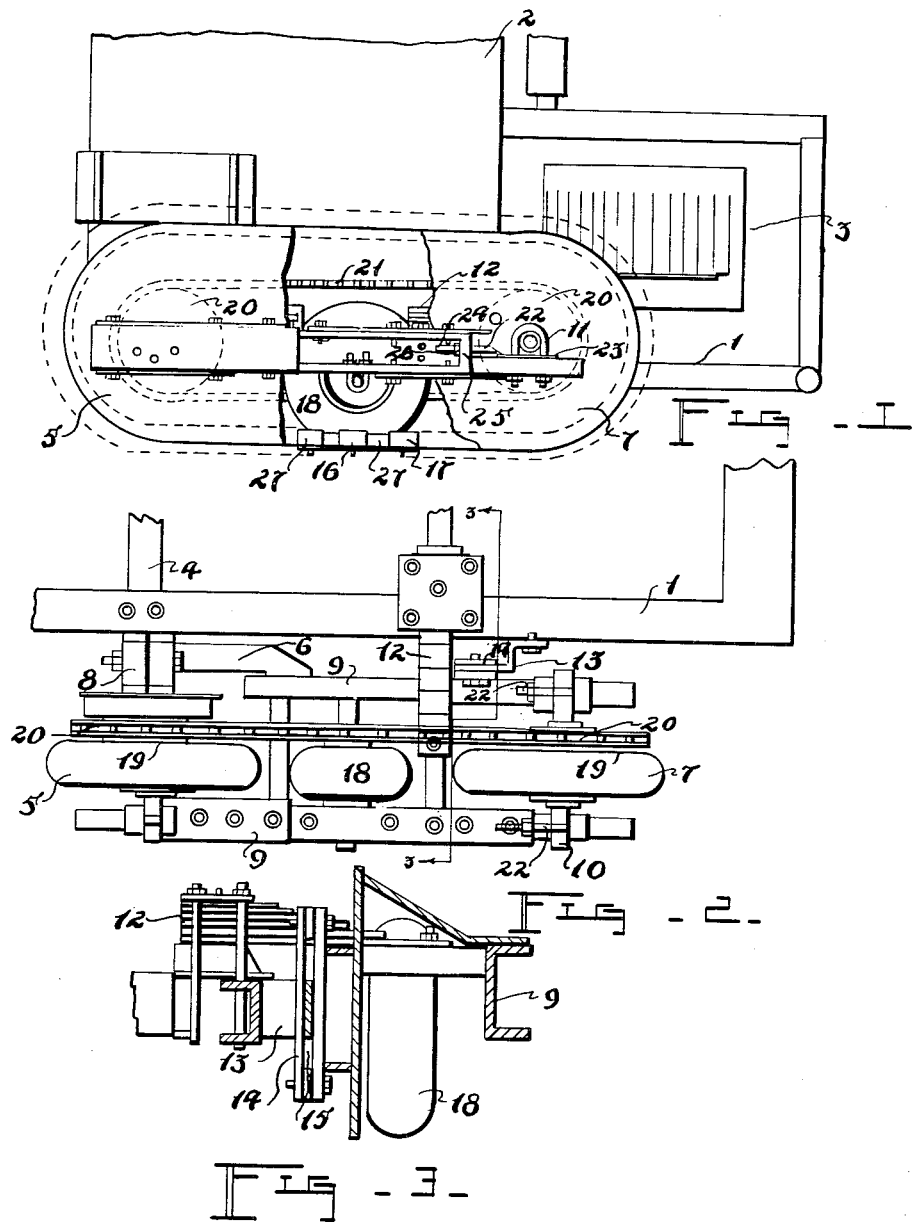

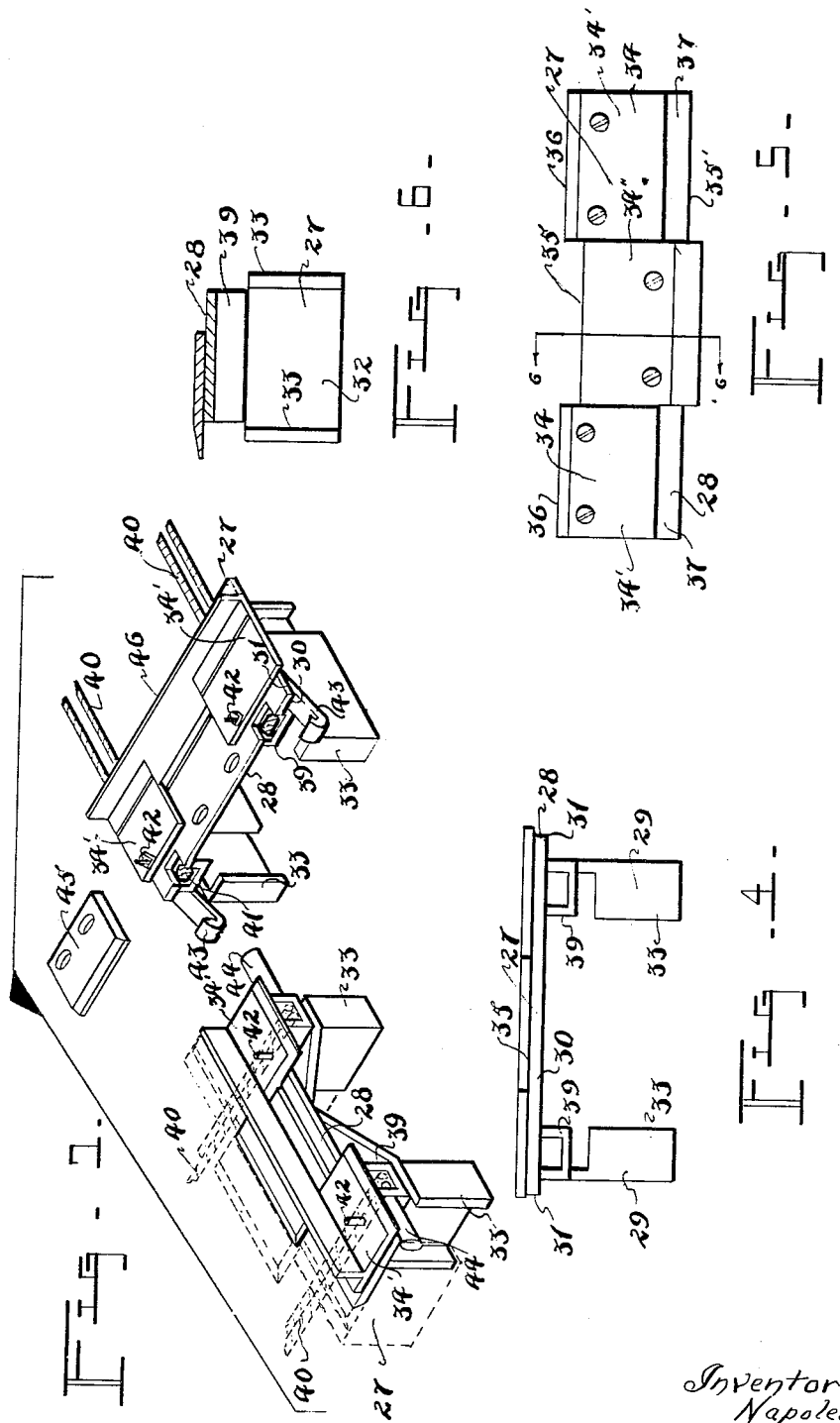

2,714,535

ENDLESS TREAD

Napoleon Loiselle, Dawson Creek, British Columbia, Canada

Application May 29, 1953, Serial No. 358,321

4 Claims. (Cl. 305—10)

My invention relates to new and useful improvements in tractor drives and treads therefor, the object of my invention being to provide a tractor tread and means to drive same which is readily adaptable for use with conventional tractors.

A further object of my invention is to provide a device of the character herewithin described which permits a conventional rubber tired tractor to be converted to a crawler type tractor without the necessity of expensive alterations.

Still another object of my invention is to provide a device of the character herewithin described which permits the conventional rubber tired tractor to be converted into a four wheel drive tractor thereby extending its usefulness considerably.

Another object of my invention is to provide a device of the character herewithin described which includes a tractor tread easily fitted to a rubber tired tractor, said tread being maintained around the wheels thereof and including means to present a sealed outer surface both when in a horizontal position and when in a curved position thereby preventing the undesirable ingress of foreign matter between the tread segments.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a fragmentary side elevation of a tractor with my drive and tread thereon.

Figure 2 is a fragmentary top plan view of one side of the tractor, but with the tread and guards removed for clarity.

Figure 3 is a view substantially along the lines 3—3 of Figure 2.

Figure 4 is an end elevation of one fragment of my tread.

Figure 5 is a top plan view of Figure 4.

Figure 6 is a sectional view along the lines 6—6 of Figure 5.

Figure 7 is a perspective exploded view showing the means to join the two ends of the tread.

In the drawings like characters of reference indicate corresponding parts in the different figures.

Figures 1, 2 and 3 of the accompanying drawings illustrate a tractor design comprising a framework 1, cab 2 and source of power generally indicated at 3. The rear axle 4 of the tractor is conventional in design and is adapted to transmit power from the source of power to the rear wheel 5, but as this transmission of power is conventional, same is not illustrated.

The outer extension of the rear axle 4 which carries the rear wheel 5 also provides bearing support for a cantilever framework collectively designated 6, which extends forwardly to carry the front wheel 7.

This framework includes a split type bearing 8 surrounding the axle 4 and is adapted to permit limited radial action of the framework above the axle. Supporting girders 9 extend forwardly and are adapted to support the front axle 10 therebetween, said axle being secured to the girders by means of U-bolts 11.

A quarter elliptical spring 12 is anchored to the main frame 1 of the tractor and extends outwardly therefrom, the outer end being secured to the aforementioned girder framework 9 just behind the front wheel axle 10, thus permitting a resilient action to the front wheels pivoting around the rear axle 4.

This resilient action is limited by the provision of a stop member 13 extending from the frame 1 and passing between limit guides 14 mounted upon the grider 9, details of which are shown in Figure 3, and it should be understood that the vertical or resilient movement of the wheel assembly is limited by the length of the slot 15 formed between the limit guides 14.

A tread assembly collectively designated 16 extends around the wheels 5 and 7, the lower run 17 thereof being maintained in a substantially horizontal ground engaging position by the provision of a rubber tired idler wheel 18 journalled for rotation between the girders 9 and between the wheels 5 and 7 and in alignment therewith. At this point it should also be explained that the wheels 5 and 7 are also rubber tired to enable same to grip the inner surfaces of the tread assembly.

Secured to the inner sides 19 of the wheels 5 and 7 are sprocket wheels 20 having a sprocket chain 21 extending therearound, thus transmitting the drive from the rear wheel 5 to the front wheel 7.

The tension in the chain 21 and in the tread assembly 16 is controlled by the provision of tightener devices 22 coacting between the girders 9 and the front axle 10. These tightening devices are substantially conventional and consist of a plate 23 secured to the U-bolts 11 and having a screw threaded rod 24 passing through a web 25 of the girders 9 with nuts 26 upon either side thereof. This adjustment, together with the fact that the aperture through which the U-bolts 11 pass are elongated, permits the front wheel axle to be moved forwardly or rearwardly within limits thus tightening or loosening the chains 21 and the tread 16.

Turning now to a description of the tread assembly 16, reference should be had to views 4 to 7 inclusive, which show the details of this tread assembly. The tread assembly consists of a plurality of segments 27 connected together in an articulated manner and joined at the ends thereof to form an endless tread. Each segment comprises a transverse ground engaging web 28 substantially rectangular when viewed in plan and having a pair of depending side members 29 secured to the underside 30 thereof and adjacent the ends 31 thereof.

These side members include end plates 32 and interlocking flanges 33, it being understood that the interlocking flanges face inwardly and outwardly alternately as shown in the left-hand portion of Figure 7, thus permitting adjacent segments to be loosely connected together by means of these interlocking flanges.

From the foregoing, it will be appreciated that a length of tread can be formed by interlocking a series of segments together and providing means to maintain the segments in the assembled position, this means being hereinafter described. However, it will also be appreciated that the series of transverse ground engaging webs thus formed will separate one from the other as the tread is flexed around a curve such as the wheel, thus permitting foreign matter to enter and clog the segments, which may well prevent the segments from straightening out after having passed around the curve.

This undesirable result is prevented by the provision of a set of staggered overlapping plates 34 secured to the outer surface 35 of each transverse ground engaging web. It will be seen that the two outer plates 34' overlap one edge 35 of the web and that the centre plate 34" overlaps the other edge 35' of the web, so that when adjacent webs are connected, the projecting portions 36 of plate 34' of one web nests into the recesses 37 formed by the plates on the other web, thus providing a sealed surface to the entire tread assembly, but which can pass around the radius of the wheel.

Referring back to the means to maintain the segments in their interlocked and articulated position hereintofore described, reference to Figures 4 and 7 will show the provision of cable channels 39 upon the underside 30 of the webs of each segment and adjacent the end plates 32 of the guide members, it being understood that when the segments are asembled in adjacent order, these channels are in alignment one with the other.

When the tread is assembled and laid out horizontally steel cables 40 are threaded through the cable channel 39 from end to end, the ends 41 of the cable being anchored securely to the end segments by means of pins 42 and braxing (not illustrated), thus providing a flexible articulated assembly consisting of the plurality of segments held in position upon the cables 40.

Having described the assembly of the tread assembly it will be apparent that means have to be provided in order to join the two ends of the assembly after they have been placed around the wheels of the tractor, and Figure 7 illustrates in perspective the two ends to be joined, together with the means provided to join same.

Dealing first with the end segment shown on the right hand side of Figure 7, it will be seen that a pair of hooks 43 extend from the underside 30 of the web 28 and adjacent the ends 31 thereof, said hooks inclining downwardly and then curving upwardly as illustrated.

The end segment shown on the left-hand side of Figure 7, is provided with hook anchors 44 consisting of small rods extending outwardly from the cable channels 39. When assembling these two segments together, the inturned flanges 33 of the right hand segment are engaged behind the outturned flanges 33 of the left hand segment and the hooks 43 are engaged under and around the rods 44, thus locking the two segments together.

Undesirable disengagement of these two segments is prevented by the provision of a detachable plate 45, which is then placed between the outer plate 34' and bolted into position upon the web 28 with bolts (not illustrated).

When the tread assembly is then assembled around the wheels 5 and 7 of the tractor, the interlocking side members overlap the side walls of the tires, thus preventing undesirable sideways displacement of the tread.

In conclusion, transverse lugs 46 are secured to the outer surfaces of the plate 34 to facilitate the tread gripping the ground over which the tractor is travelling.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A tread assembly for tractors for use in conjunction with the rubber tired wheels thereof, said assembly comprising a plurality of segments, means to secure said segments in an adjacently articulated relationship, and means to join the ends of said tread assembly, thereby forming an endless tread, each of said segments comprising a transverse ground engaging web, side members extending at right angles from the underside of said web and adjacent the ends thereof, adjacent side members being adapted to interlock one with the other, and cable channels formed on the underside of said web adjacent said side members, said means to join the ends of said tread assembly together comprising a pair of hooks extending from the underside of one of said webs, hook anchors secured to the underside of the other of said webs, said hooks being adapted to engage around said anchors, and a locking plate spanning part of each of the upper sides of said webs.

2. The device according to claim 1 in which said first-mentioned means includes a plurality of cables extending through said cable channels, said cables being anchored at the ends of said tread assembly, said means to join the ends of said tread assembly together comprising a pair of hooks extending from the underside of one of said webs, hook anchors secured to the underside of the other of said webs, said hooks being adapted to engage around said anchors, and a locking plate spanning part of each of the upper sides of said webs.

3. The device according to claim 2 which includes means to seal said tread assembly on the ground engaging surface thereof, against the ingress of foreign matter, said means including a set of staggered overlapping plates secured to each of said ground engaging webs, the plates of one web interlocking and being coterminous with the plates of the web upon either side thereof.

4. The device according to claim 1 which includes means to seal said tread assembly on the ground engaging surface thereof, against the ingress of foreign matter, said means including a set of staggered overlapping plates secured to each of said ground engaging webs, the plates of one web interlocking and being coterminous with the plates of the web upon either side thereof.

References Cited in the file of this patent

UNITED STATES PATENTS

| 1,178,074 | Howard | Apr. 4, 1916 |
| 1,230,504 | Nelson | June 19, 1917 |
| 1,261,827 | McCollum | Apr. 9, 1918 |
| 2,179,587 | Deardorff | Nov. 14, 1939 |
| 2,423,544 | Acton | July 8, 1947 |
| 2,426,342 | Couse | Aug. 26, 1947 |

FOREIGN PATENTS

| 507,657 | Great Britain | June 20, 1939 |
| 862,778 | France | Dec. 16, 1940 |